(12) United States Patent
Parker et al.

(10) Patent No.: US 6,236,785 B1
(45) Date of Patent: May 22, 2001

(54) VARIABLE OPTICAL SPLITTER

(75) Inventors: Jeffrey R. Parker, Strongsville; Jeffrey B. Williams, Ravenna, both of OH (US)

(73) Assignee: Lumitex, Inc., Strongsville, OH (US)

( * ) Notice: Subject to any disclaimer, the term of this patent is extended or adjusted under 35 U.S.C. 154(b) by 0 days.

(21) Appl. No.: 09/073,571

(22) Filed: May 6, 1998

(51) Int. Cl.$^7$ .............................. G02B 6/26; G02B 6/125
(52) U.S. Cl. .................. 385/48; 385/25; 385/47; 385/901; 362/552
(58) Field of Search ............................ 385/25, 45–48, 385/50, 146, 901, 22; 362/551, 552, 554, 556, 285, 289

(56) References Cited

U.S. PATENT DOCUMENTS

| | | | |
|---|---|---|---|
| 3,977,764 | * 8/1976 | D'Auria et al. ..................... 385/25 |
| 4,072,399 | * 2/1978 | Love .................................. 385/46 |
| 4,135,779 | * 1/1979 | Hudson ............................. 385/45 |
| 4,150,870 | * 4/1979 | D'Auria ............................ 385/45 |
| 4,325,604 | * 4/1982 | Witte ................................ 385/25 |
| 5,293,435 | * 3/1994 | Takahashi ...................... 385/47 X |
| 5,408,556 | * 4/1995 | Wong ................................ 385/48 |
| 5,604,828 | * 2/1997 | Yaffe ................................ 385/14 |
| 5,889,898 | * 3/1999 | Koren et al. ........................ 385/9 |

* cited by examiner

Primary Examiner—Rodney Bovernick
Assistant Examiner—Michael J. Stahl
(74) Attorney, Agent, or Firm—Renner, Otto, Boisselle & Sklar, LLP

(57) ABSTRACT

An optical splitter for distributing a beam of light along a plurality of output paths. The amount of light output from each output path is user adjustable according to one embodiment of the present invention. In another embodiment the amount of light output from each output path is determined by the arrangement of the optical splitter. The present invention allows a single high-power high-intensity light generation source to simultaneously provide light to a plurality of lighting devices, instruments or tools.

16 Claims, 2 Drawing Sheets

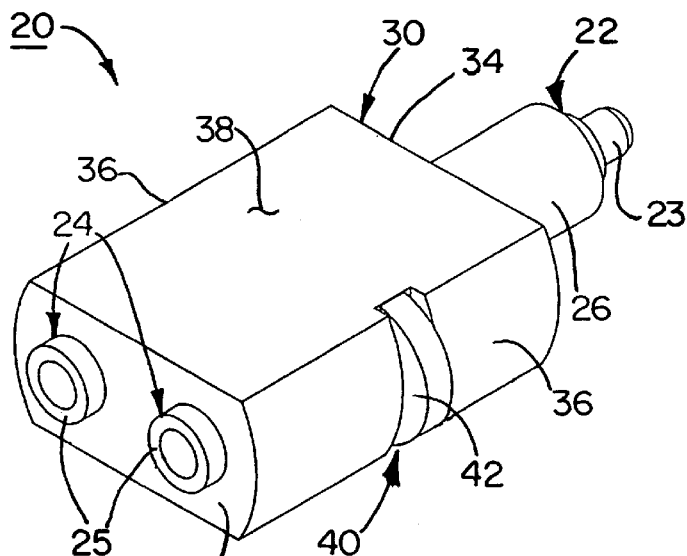
FIG.1
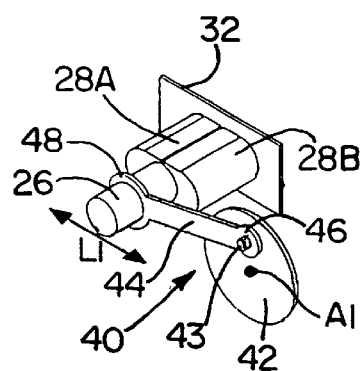
FIG.2
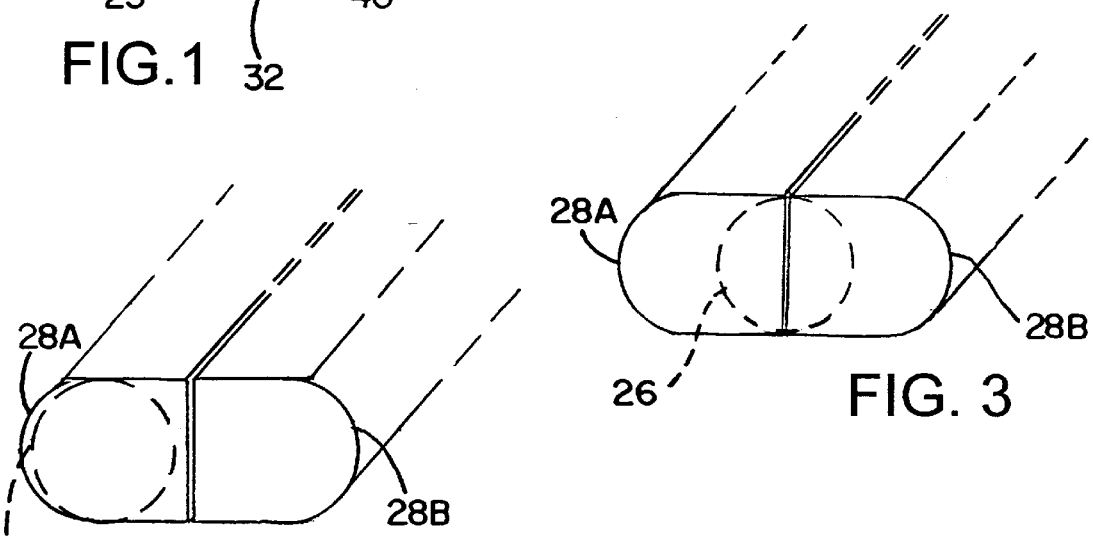
FIG. 3
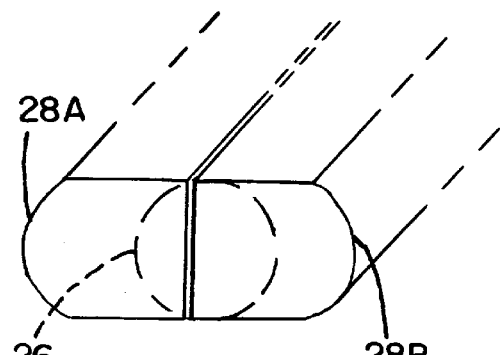
FIG. 4
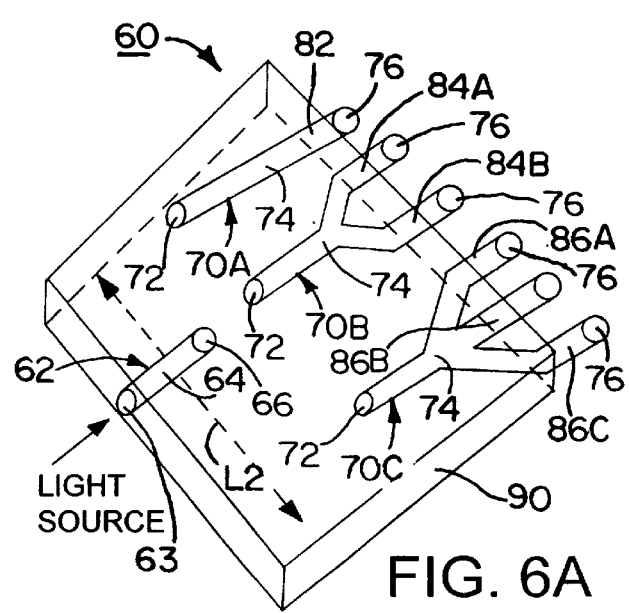
FIG. 5
FIG. 6A

VARIABLE OPTICAL SPLITTER

FIELD OF INVENTION

The present invention generally relates to an optical splitter, and more particularly the present invention relates to an optical splitter for guiding a beam of light among a plurality of paths.

BACKGROUND OF THE INVENTION

High-power high-luminance light sources, such as a 300 Watt Xenon arc lamp light generator, are used in many important applications, including medical procedures. In this regard, the light source is used to generate light for illuminating a work area, such as a portion of a body involved in surgery. The light source typically supplies light to head gear worn on a surgeon's head. The light is focused onto the work area to aid the surgeon's vision. One drawback to these high-power, high-luminance light sources is that they are very costly. A typical arc lamp light generator can cost in the range of $3000–$4000. Accordingly, there is a need to obtain greater cost efficiencies from such devices, by allowing a single light source to simultaneously supply light to a plurality of tools or instruments. The present invention addresses these and other drawbacks of the prior art.

SUMMARY OF THE INVENTION

According to the present invention there is provided an optical splitter for distributing input light waves among one or more output light paths.

An advantage of the present invention is the provision of an optical splitter which allows the efficient distribution of light to be selectively varied among a plurality of light output paths.

Another advantage of the present invention is the provision of an optical splitter which includes a plurality of adapters for dividing and sub-dividing the distribution of light among a plurality of paths.

Still another advantage of the present invention is the provision of an optical splitter which varies the distribution of light among a plurality of paths by modifying the position of a light source relative to the plurality of paths.

Still another advantage of the present invention is the provision of an optical splitter which variably distributes light among a plurality of fixed light output paths.

Yet another advantage of the present invention is the provision of an optical splitter which distributes light among a plurality of paths by reflecting light from a light source.

Still other advantages of the invention will become apparent to those skilled in the art upon a reading and understanding of the following detailed description, accompanying drawings and appended claims.

BRIEF DESCRIPTION OF THE DRAWING

The invention may take physical form in certain parts and arrangements of parts, a preferred embodiment and method of which will be described in detail in this specification and illustrated in the accompanying drawings which form a part hereof, and wherein:

FIG. 1 is a front perspective view of an optical splitter according to a first embodiment of the present invention;

FIG. 2 is a perspective view of the selector of the optical splitter shown in FIG. 1;

FIG. 3 illustrates a 50-50 position of the optical splitter shown in FIG. 1;

FIG. 4 illustrates a 100-0 position of the optical splitter shown in FIG. 1;

FIG. 5 illustrates a 30-70 position of the optical splitter shown in FIG. 1;

FIG. 6A is a perspective view of an optical splitter according to a second embodiment of the present invention;

DETAILED DESCRIPTION OF THE PREFERRED EMBODIMENT

Figure 6B:
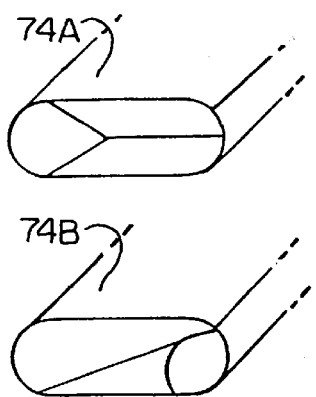
FIG. 6B illustrates alternative light distributor embodiments.

Referring now to the drawings wherein the showings are for the purpose of illustrating preferred embodiments of the invention only and not for the purpose of limiting same, FIG. 1 shows an optical splitter 20 according to a first embodiment of the present invention. Optical splitter 20 is generally comprised of a housing 30, an input port 22, an output port 24, and a selector 40.

Housing 30 is generally comprised of a front face 32, a rear face 34, side walls 36, top wall 38 and a bottom wall. Housing 30 houses selector 40, which is described in detail below.

Input port 22 and output port 24 are respectively used to receive light waves into splitter 20 and transmit light waves from splitter 20. Input port 22 includes an input light distributor 26 for receiving light from an external light source, and carrying the light into housing 30. It should be understood that the light source may take the form of a light generation means, (such as a Xenon arc lamp light generator), or another light distributor located "downstream." Input light distributor 26 includes an input interface 23 for connecting input port 22 to the external light source. In a preferred embodiment, input interface 23 takes the form of a male connector. Output port 24 includes a plurality of output light distributors 28A, 28B for transmitting light exiting from splitter 20 to an instrument, tool, or another optical splitter. Output light distributors 28A, 28B include a respective output interface 25 for connecting output port 24 with a receiving light distributor. In a preferred embodiment, output interfaces 25 take the form of female connectors. It should be appreciated that output light distributors 28A and 28B are aligned adjacent to each other, and input light distributor 26 is located adjacent to output light distributors 28A and 28B (FIG. 2). Input light distributor 26, and output light distributors 28A, 28B are optical conductors which propagate light via internal reflection or refraction, as will be readily understood by one of ordinary skill in the art.

Selector 40 will now be described with reference to FIG. 2. Selector 40 varies the amount of light distributed by each of the output ports 24, and includes dial 42 and arm 44. Dial 42 protrudes from a side wall 36 of housing 30, and provides a user interface for adjusting splitter 20, as will be explained below. In a preferred embodiment, dial 42 takes the form of a generally circular disk, which is rotatable about its central axis A1. Arm 44 connects dial 42 with input port 22, and more particularly input light distributor 26. In this regard, arm 44 includes a first connector 46 for attaching arm 44 to dial 42, and a second connector 48 for attaching arm 44 to input light distributor 26. In a preferred embodiment, first connector 46 takes the form of a ring or eye, which is dimensioned to receive a protrusion 43 (e.g., a stud or pin) which protrudes from the surface of dial 42. Second connector 48 also takes the form of a ring or eye, which is dimensioned to fit around input light distributor 26.

As dial 42 is rotated about central axis A1, input light distributor 26 is moved laterally, in the direction of line L1. Consequently, input light distributor 26 is moved relative to output light distributors 28A and 28B, as will now be explained with reference to FIGS. 3–5. As indicated above, output light distributors 28A and 28B are aligned adjacent to each other. Accordingly, the light transmitted by input light distributor 26 in the vicinity of output light distributors 28A and 28I will either be received by output light distributor 28A or by output light distributor 28B. As a result, the percentage of light distributed by each output light distributor 28A, 28B will vary depending upon the position of input light distributor 26 relative to output light distributors 28A, 28B. For instance, in the case where input light distributor 26 is centrally aligned (FIG. 3), output light distributors 28A and 28B will each distribute 50% of the light transmitted by input light distributor 26. When input light distributor 26 is positioned as shown in FIG. 4, output light distributor 28A will distribute 100% of the light transmitted by input light distributor 26, while output light distributor 28B will distribute 0% (no light). When input light distributor 26 is positioned as shown in FIG. 5, output light distributor 28A will distribute 30% of the light transmitted by input light distributor 26, while output light distributor 28B will distribute 70%. Accordingly, as dial 42 is rotated the percentage of light distributed by each output light distributor is varied. In this respect, the amount of light distributed via each output light distributor will vary a predetermined amount in accordance with the external adjustment of selector 40.

It should be appreciated that the form of selector 40 shown in FIG. 2–5 is provided solely for the purpose of illustrating a preferred embodiment of the present invention and not for limiting same. In this regard, selector 40 can take other suitable forms for modifying the position of the input light distributor relative to the output light distributors. For instance, selector 40 may take the form of a linear movement device (e.g., a linear slide), which moves the input light distributor relative to the output light distributor in a linear fashion. Moreover, it should be understood that while optical splitter 20 has been shown as having only two output ports for the purpose of illustrating a preferred embodiment of the present invention, optical splitter 20 may have more than two output ports to divide the light input to splitter 20 among three or more paths.

Turning now to FIG. 6A, there is shown a second embodiment of the present invention. Optical splitter 60 is generally comprised of a housing 90, an input port 62, output guide pipes 70 and a selector means (not shown).

Housing 90 houses input port 62, output guide pipes 70A, 70B, 70C and the selector means. Input port 62 and output guide pipes 70A, 70B and 70C are respectively used to receive light into splitter 60 and transit light from splitter 60. Input port 62 includes an input light distributor 64 for receiving light from an external light source (e.g., a Xenon arc lamp light generator) and carrying the light into housing 90. Input light distributor 64 includes an input interface 63 for connecting input port 62 to the external light source. Input light distributor 64 terminates at an output interface 66.

Each output guide pipe 70A, 70B and 70C is comprised of a light distributor 74 having a single input interface 72 and one or more respective output paths 82, 84A, 84B, 86A, 86B and 86C. The output paths terminate at output interfaces 76. Each output path is capable of transmitting light to an instrument, tool, or another optical splitter. Light distributors 74 propagate light via internal reflection or refraction, as will be readily understood by one of ordinary skill in the art.

It should be appreciated that output guide pipes 70 distribute the light along one or more paths. In this regard, output guide pipe 70A distributes 100% of the light received at input interface 72 to output path 82. Output guide pipe 70B distributes 50% of the light received at input interface 72 to output path 84A and 50% to output path 84B. Similarly, output guide pipe 70C distributes 33⅓% of the light received at input interface 72 to output path 86A, 33⅓% to output path 86B, and 33⅓% to output path 86C. Accordingly, in the case of an output guide pipe having N output paths, each output path will distribute 1/N of the total light received by the output guide pipe. In this embodiment, while the output guide pipes are selectable, the distribution of light provided by each output guide pipe is fixed. It should be understood that the distribution percentages noted herein take account for system losses.

The purpose of the selector means is to selectably align output interface 66 of input port 62 with one of the input interfaces 72. Selector means (not shown) may take many suitable forms, including rotating means for rotational movement or sliding means for linear movement. The rotating means or sliding means move input port 62 relative to output guide pipes 70, or vice versa. In the embodiment illustrated in FIG. 6A, selector means moves input port 62 relative to output guide pipes 70 along line L2. It should be noted that output interface 66 and input interfaces 72 will be arranged adjacent and flush to their respective surfaces when appropriately aligned. In a preferred embodiment 100% of the light transmitted from output interface 66 is received by input interface 72. However, the percentage of light received by input interface 72 may be reduced by changing the alignment of output interface 66 relative to input interface 72, such that some percentage of the light from output interface 66 is not transmitted to input interface 72.

It should be appreciated that the number and type of output guide pipes shown in FIG. 6A are examples only. For instance, the output guide pipes may distribute light along more than three paths. Moreover, the light distributors may take a variety of suitable forms. In this regard, the light distributors may allow for variable adjustment of the light distribution among each output path. For instance, FIG. 6B illustrates examples of light distributors 74A, 74B and 74C, which allow for variable adjustment of the light distribution among three output paths. (e.g., output paths 86A, 86B and 86C of light distributor 70C). The light is distributed among the output paths in a similar manner as discussed in connection with the embodiment shown in FIGS. 3–5.

Figure 7:
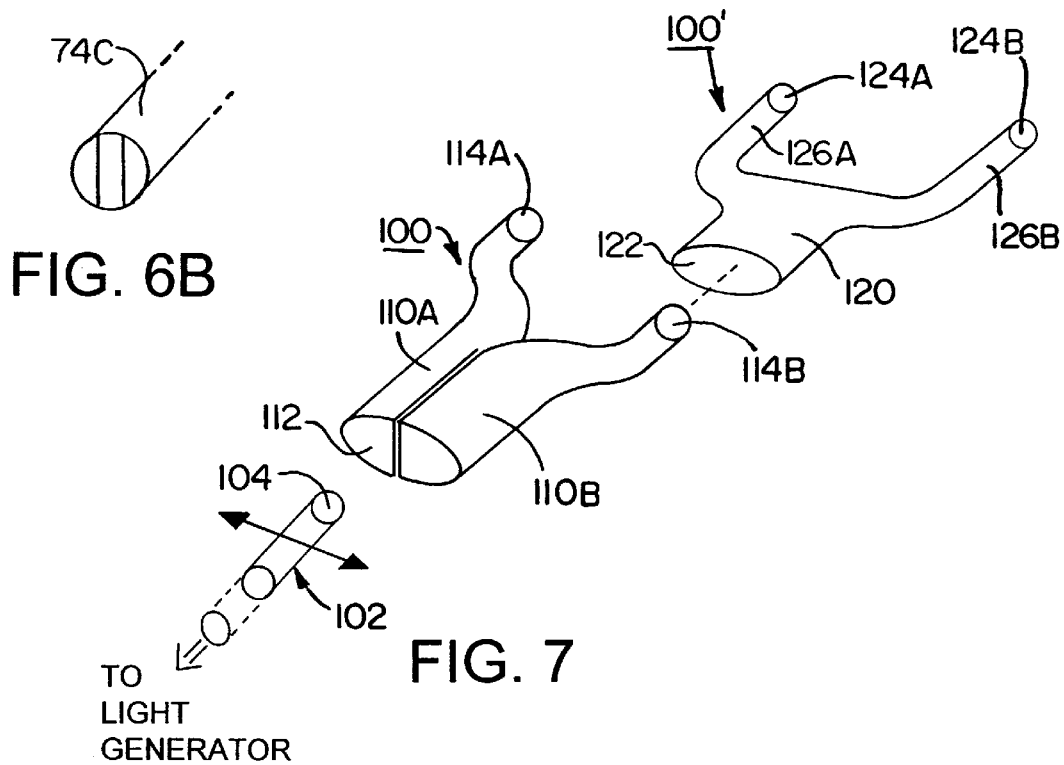
FIG. 7 is a perspective view of an optical splitter according to third and fourth embodiments of the present invention.

Referring now to FIG. 7, there is shown a stackable optical splitter 100, according to another embodiment of the present invention. Splitter 100 is generally comprised of an input port 112, light distributors 110A and 110B, and respective output ports 114A and 114B. Input port 112 is dimensioned to accept output interface 104 of input light source 102. In this regard, input port 112 is suitably coupled with output interface 104. Furthermore, input port 112 is also dimensioned to suitably couple with other stackable splitters. The distribution of light to output ports 114A and 114B will vary depending upon the position of output interface 104 in input port 112. Similar to the operation of splitter 20, the light input to input port 112 will be divided between the pair of light distributors 110A and 110B. As previously noted, light distributors 110A, 110B propagate light via internal reflection or refraction, as will be readily understood by one of ordinary skill in the art.

A second splitter 100', according to another embodiment of the present invention, is also shown. Splitter 100' further splits the light exiting output port 114B. Splitter 100' interfaces with output port 114B, as will be explained below. Splitter 100' is generally comprised of light distributor 120, input port 122 and output ports 124A and 124B. Light distributor 120 includes paths 126A and 126B, which respectively terminate at output ports 124A and 124B.

In this embodiment the distribution of light is fixed. In this regard, light entering input port 122 is distributed evenly between paths 126A and 126B. Accordingly, 50% of the light received at input port 122 will be output at output port 124A, and 50% of the light received at input port 122 will be output at output port 124B.

It should be appreciated that splitters 100 and 100' can have more than two output ports, and can thus further divide the distribution of light. Moreover, it should also be understood that one or more splitters 100 and/or 100' may be linked together to distribute light among a plurality of paths.

Figure 8:
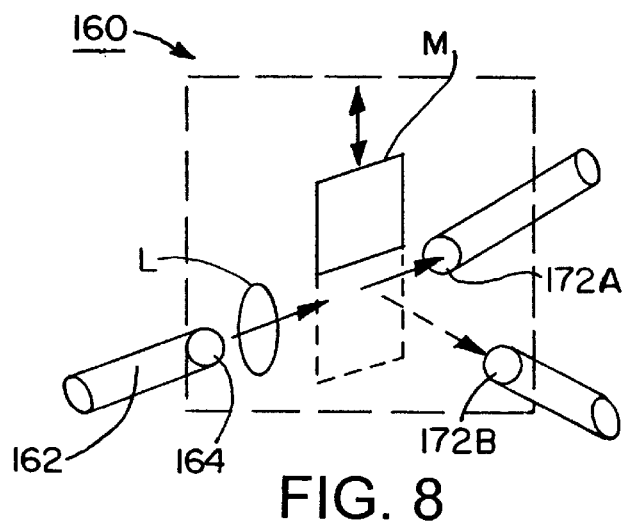
FIG. 8 is a perspective view of an optical splitter according to a fifth embodiment of the present invention.

FIG. 8 shows a splitter 160 according to yet another embodiment of the present invention. In this embodiment, splitter 160 is generally comprised of an input port 164, a light reflecting member M, a lens L, and output ports 172A and 172B. Input port 164 receives light from an input light source 162. Light reflecting member M is a movable reflector, such as a mirror, or a beam splitter. In a preferred embodiment light reflecting member M is at a 45 degree angle to input port 164. Moreover, an optional lens L is positioned in front of input port 164 to focus the light received therefrom. Output port 172A receives light directly from lens L, or in the case where lens L is not present, directly from input port 164. Output port 172B receives reflected light, which is reflected by light reflecting member M to output port 172B. Depending upon the position of light reflecting member M relative to the input beam of light, a variable amount of light will reach output port 172B. For instance, if light reflecting member reflects 20% of the light from input port 164 to output port 172B, then output port 172A will distribute only 80% of the light from input port 164. The input port and output ports propagate light via internal reflection or refraction, as will be readily understood by one of ordinary skill in the art.

It should be appreciated that the optical splitters shown in the Figures are provided solely for the purpose of illustrating preferred embodiments of the present invention. In this regard, the present invention may take many other suitable forms. For instance, a light source is suitably distributed or modified using various mechanical means, lenses, prisms, micro-mirrors, light filters, polarizers, beam splitters, light valves, LCD shutters, and diffraction gratings. In the case of a filter, the filter is suitably used to filter colors, infrared rays or ultra violet rays.

It should also be appreciated that the light distributors may be formed of molded plastic, fiber optic (plastic or glass), flexible or rigid polymer, glass, quartz, or other material suitable for transmitting light.

Moreover, the light distributors may not be round, but rather shaped to accommodate a particular application (e.g., square, hexagonal, wedge-shaped, etc.). In addition the light distributors may be shaped to mix light along their length to cause a uniform output at the end of the light distributor. Furthermore, the light distributors may have coatings or filters at their ends to provide desired properties, such as color effects, reflect or absorb heat, reflect or absorb specific frequencies of light, and the like.

The light source may take such forms as an LED, laser diode, laser, arc lamp, halogen lamp, incandescent lamp, fluorescent tube, or any other suitable light generating means. The light can also be generated by a remote light source and fed to the optical splitter via a light pipe or optical cable.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. An optical splitter comprising:
   input means adapted for receiving input light waves;
   output means adapted for transmitting the input light waves along one or more of a plurality of independent light distribution means, at least one of said light distribution means including a plurality of output paths; and
   distribution means adapted for selectively distributing the input light waves among the light distribution means, said distribution means including selector means for moving one of said input means and said output means relative to the other of said inout means and said output means for selectively varying the amount of light waves distributed through each of said output paths.

2. An optical splitter according to claim 1, wherein said selector means selectively varies the amount of light waves by a predetermined amount relative to an external adjustment means.

3. An optical splitter according to claim 1, wherein said one light distribution means includes N output paths, wherein N is more than one, and wherein each output path distributes 1/N of the total light waves received by said one light distribution means, taking account for system losses.

4. An optical splitter according to claim 1, wherein said moving means is a linear moving means for linear movement of one of said input means and said output means relative to the other of said input means and said output means.

5. An optical splitter according to claim 1, wherein said moving means is a rotational moving means for rotational movement of one of said input means and said output means relative to the other of said input means and said output means.

6. An optical splitter according to claim 1, wherein said distribution means includes at least one of the following: mirror, prism, lens, polarizer, beam splitter, light valve, LCD shutter, diffraction grating and filter.

7. An optical splitter according to claim 1, wherein said distribution means includes at least one of: molded plastic and flexible polymer.

8. An optical splitter comprising:
   input means adapted for receiving input light waves;
   a plurality of output means adapted for transmitting input light waves along one or more output paths; and
   selector means for moving one of said input means and said output means relative to the other of said input means and said output means for selectively distributing the input light waves through each of a plurality of output paths, at least one of said output means including N output paths, wherein N is greater than one, and wherein each output path distributes 1/N of the input light waves received by said one output means, taking account for system losses.

9. An optical splitter according to claim 8, wherein said selector means aligns said input means with a selected one of said plurality of output means.

10. An optical splitter according to claim 8, wherein said selector means aligns said input means with one or more of said plurality of output means, wherein the position of the input means relative to one or more of said plurality of output means determines the distribution of light waves for said respective output means.

11. An optical splitter according to claim 8, wherein said plurality of output means propagate light waves through internal reflection or refraction.

12. An optical splitter comprising:

input means adapted for receiving input light waves;

output means adapted for transmitting the input light waves along one or more of a plurality of independent light distribution means, at least one of said light distribution means including a plurality of output paths; and distribution means adapted for selectively distributing the input light waves among the light distribution means, said distribution means including selector means for selectively varying the amount of light waves distributed among said output paths, and said selector means including moving means for moving one of said input means and said output means relative to the other of said input means and said output means, said moving means including arm means engageable with said input means, and rotatable dial means for moving said arm means.

13. An optical splitter comprising:

input means adapted for receiving input light waves, wherein said input means includes a coupling means for coupling said optical splitter to a light source means; and a plurality of output means adapted for transmitting the input light waves along one or more output paths, wherein each said output means includes N output paths, wherein N is greater than one, and wherein the amount of input light waves distributed through each output path is variable, said optical splitter includes selector means for varying the amount of light distributed through each output path, and said selector means includes a mirror for reflecting light.

14. An optical splitter comprising:

input means adapted for receiving input light waves, wherein said input means includes a coupling means for coupling said optical splitter to a light source means; and a plurality of output means adapted for transmitting the input light waves along one or more output paths, wherein each said output means includes N output paths, wherein N is greater than one, and wherein the amount of input light waves distributed through each output path is variable, said optical splitter includes selector means for varying the amount of light distributed through each output path, and said selector means includes a beam splitter for reflecting light.

15. An optical splitter comprising:

input means adapted for receiving input light waves, wherein said input means includes a coupling means for coupling said optical splitter to a light source means; and a plurality of output means adapted for transmitting the input light waves along one or more output paths, wherein each said output means includes N output paths, wherein N is greater than one, and selector means for moving one of said input means and said output means relative to the other of said input means and said output means for selectively varying the amount of input light waves distributed through each output path.

16. An optical splitter according to claim 15, wherein said optical splitter includes distribution means for modifying the distribution of light through each output path, wherein said distribution means includes at least one of the following: mirror, prism, lens, polarizer, beam splitter, light valve, LCD shutter, diffraction grating and filter.

* * * * *